United States Patent [19]

Chiu

[11] Patent Number: 5,062,178

[45] Date of Patent: Nov. 5, 1991

[54] WHEEL UNIT FOR A SLIDABLE INFANT CHAIR

[75] Inventor: Hsiu-Hui Chiu, Tainan Hsien, Taiwan

[73] Assignee: Sunshon Molding Co., Ltd., Tainan Hsien, Taiwan

[21] Appl. No.: 625,468

[22] Filed: Dec. 11, 1990

[51] Int. Cl.⁵ ............................................. B60B 33/00
[52] U.S. Cl. ............................................. 16/38; 16/30
[58] Field of Search ................... 16/38, 39, 18 R, 29, 16/30; 272/70.3

[56] References Cited

U.S. PATENT DOCUMENTS

| | | | |
|---|---|---|---|
| 938,866 | 11/1909 | Humphrey | 16/39 |
| 1,912,795 | 6/1933 | Rice et al. | 16/38 |
| 2,173,950 | 9/1939 | Parkhill | 16/38 |
| 2,434,863 | 1/1948 | Parkhill | 16/38 |
| 4,068,342 | 1/1978 | Carrier | 16/38 |
| 4,793,021 | 12/1988 | Deasy et al. | 16/273 |
| 4,953,257 | 9/1990 | Andre | 16/38 |

Primary Examiner—Robert L. Spruill
Attorney, Agent, or Firm—Morton J. Rosenberg; David I. Klein

[57] ABSTRACT

This invention relates to a wheel unit for a slidable infant chair. The characteristic of this invention is in that there is a rod cap positioned at the upper part of the wheel unit. The rod cap has a hollow for receiving in a rod. There are two opposite U-shape cut, whose interiors become two elastic fragments, positioned in the upper side wall of the rod cap. The lower side wall of the rod cap is attached by a flanged annulus, which has fine projecting stripes around the side surface and has a splintery upward surface. In assemblage, first, insert a rod into the hollows of a rod supporter and the rod cap so as to assemble them. Then, insert the upper part of the assembled wheel unit into a fixing sleeve under an annular frame of a slidable infant chair, with the condition that the two opposite U-shape fragments spring outward for the wheel unit to be fixed in the fixing sleeve.

2 Claims, 6 Drawing Sheets

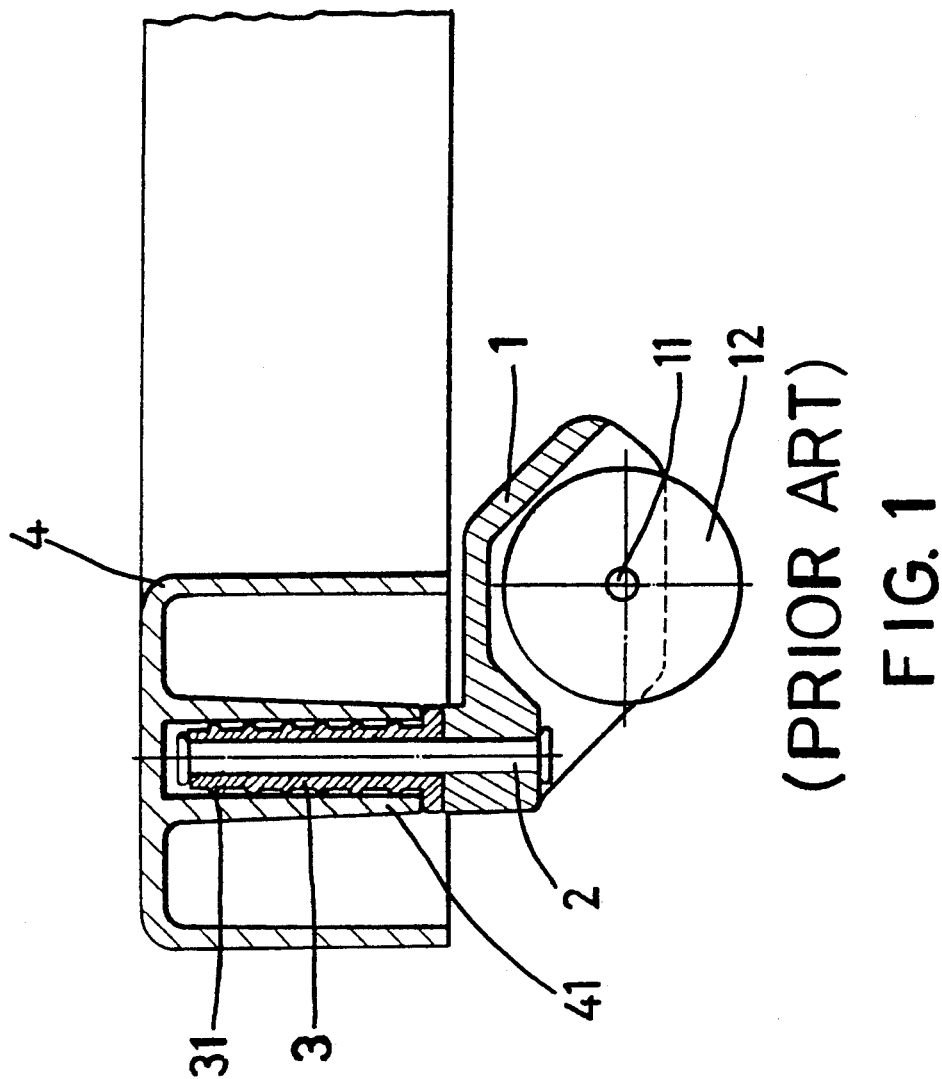

WHEEL UNIT FOR A SLIDABLE INFANT CHAIR

BACKGROUND OF THE INVENTION

1. Field of the Invention

This invention relates to a wheel unit for a slidable infant chair which enables an infant seated in the chair to walk around freely.

2. Description of the Prior Art

A slidable infant chair is supported by an annular frame which is provided with a plurality of wheels, enabling the infant chair to be slidable. Referring to FIG. 1, a common wheel unit includes a wheel cover 1, a wheel 12, a flat head rod 2, a rod cap 3, and a fixing sleeve 41. A horizontal rivet 11 is inserted through the wheel 12 and then riveted to the center of the wheel cover 1 so as to assemble them. The flat head rod 2 penetrates through the left portion of the wheel cover 1 and the rod cap 3, and then is riveted at both ends so as to assemble them fixedly. The rod cap 3 is covered with flanges 31 on its outer surface, and is fixedly inserted in the fixing sleeve 41 under the annular frame 4.

FIG. 2 shows another prior wheel unit, which includes a spherical wheel 1, a rod 2, and a rod cap 31 under an annular frame 3. The spherical wheel 1 has an upward rod supporter 11 with a hollow 111 inside, and close the bottom of the hollow 111 has a flanged ring 112. The said rod cap 31 has a downward opening 311, and there is a flanged ring 312 close the top of the opening 311. The said rod 2 has two snap ends, close which have ringed grooves 21 and 22 respectively, so as to be tightly inserted into the hollow 111 and the opening 311. In this way, the wheel unit is assembled and attached to the annular frame 3.

According to the description above, the two prior wheel units bear following disadvantages in their structures.

1. In the process of assemblage, mechanical tools are needed. Consequently, the process is so complicated that a consumer can not assemble the wheel units by himself.

2. The wheel units can not be disassembled once they are assembled. Therefore, they occupy much space and cost much while being packed and transported.

3. If one of the wheels under an annular frame should break down or come loose, the whole annular frame with the rest wheels has to be replaced. Thus, the structures of the prior wheel units cause much inconvenience. It is not economical for a consumer to repair them.

SUMMARY OF THE INVENTION

Accordingly, an object of this invention is to provide a wheel unit for a slidable infant chair. The present wheel unit can be assembled and disassembled with ease. Compared with the two prior arts, the present invention has the following advantages:

1. The present wheel unit is easy to be assembled and disassembled so that it takes little time and labor in the process of being assembled and disassembled. The cost of package can be reduced.

2. The present wheel unit can be packed separately from a slidable infant chair while being transported so as to save space and cost for transportation.

3. If one of the present wheel units being equipped under an annular frame of a slidable infant chair should break down or be frazzled, it can be replaced by a new one. Thus, it is convenient and economical for a consumer.

According to this invention, the wheel unit, to be assembled easily, includes a spherical wheel, a rod, a rod cap, and a fixing sleeve. The spherical wheel is provided with a rod supporter which projects vertically. The mentioned rod cap has a cylindrical hollow inside itself. There are two opposite U-shape fragments in the upper side wall of the rod cap; these two fragments are so elastic as to be able to spring outward when being released from pressure. A flanged annulus is attached around the bottom of the rod cap. The mentioned fixing sleeve is formed by two sections; the upper section is a room with an upward elliptic oppening of a major axis and a minor axis; the lower section is a cylindrical hollow whose diameter is the same length as the minor axis of the upper room.

The wheel unit is easy to be assembled. First, the rod is inserted into the rod supporter of the spherical wheel and inserted in the rod cap, so as to be respectively installed in the rod supporter and the rod cap. The next step is to insert the combined wheel unit into the fixing sleeve's top, with the situation where the two opposite U-shape fragments spring outward to be fixed in the upper room of the fixing sleeve. In this way, the wheel unit is tightly fixed under the annular frame of a slidable infant chair.

The present wheel unit can be disassembled with ease when needed. First, turn the flanged annulus of the rod cap. When the flanged annulus is turned to about an angle of ninety degrees, the two U-shape fragments of the rod cap will be squeezed back in the side wall of the rod cap. Then, the wheel unit can be entirely drawn off the fixing sleeve.

These advantages, aspects and features of the present invention will become more apparent from the following detailed description when taken in conjunction with the accompanying drawings.

BRIEF DESCRIPTION OF THE DRAWINGS

FIG. 1 is a cross-sectional view of a prior wheel unit of a slidable infant chair;

FIG. 5-1 is a view showing the released condition of the two opposite U-shape fragments in the upper room of the fixing sleeve;

FIG. 5-2 is a view showing the squeezed condition of the two opposite U-shape fragments while the rod cap being turned to about an angle of ninety degrees.

DETAILED DESCRIPTION OF THE PREFERRED EMBODIMENT

Figure 6:
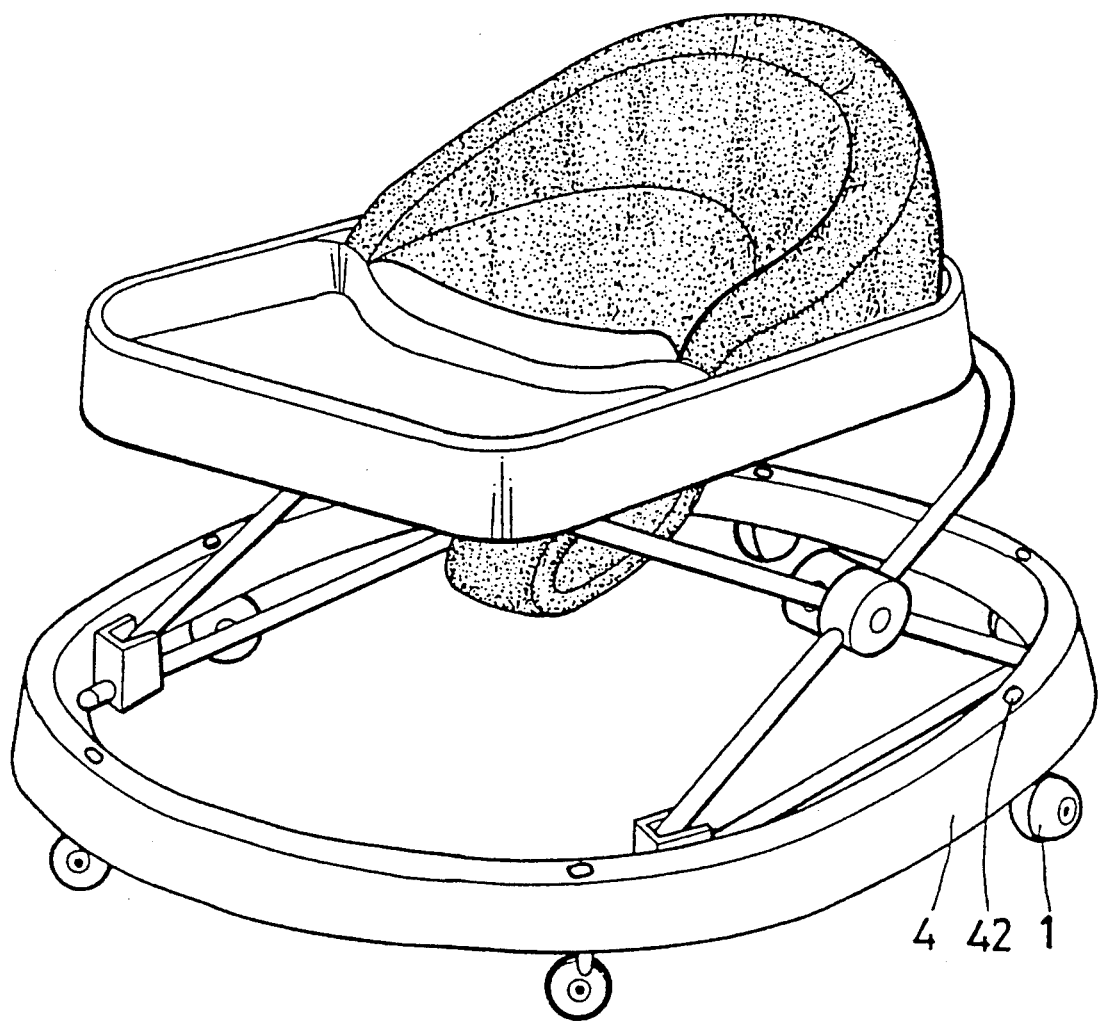
FIG. 6 is a perspective view of a slidable infant chair equipped with an embodiment of the present invention.

Referring to FIG. 6, a slidable infant chair includes a chair for an infant to be seated in, adjustable chair support rods, and an annular frame 4 with some fixing sleeves under it. It is the annular frame 4 that enables the infant chair to slide. Every fixing sleeve has a hollow 43 to receive in a wheel 1 so that the infant chair is able to slide.

Figures 3, 3A:
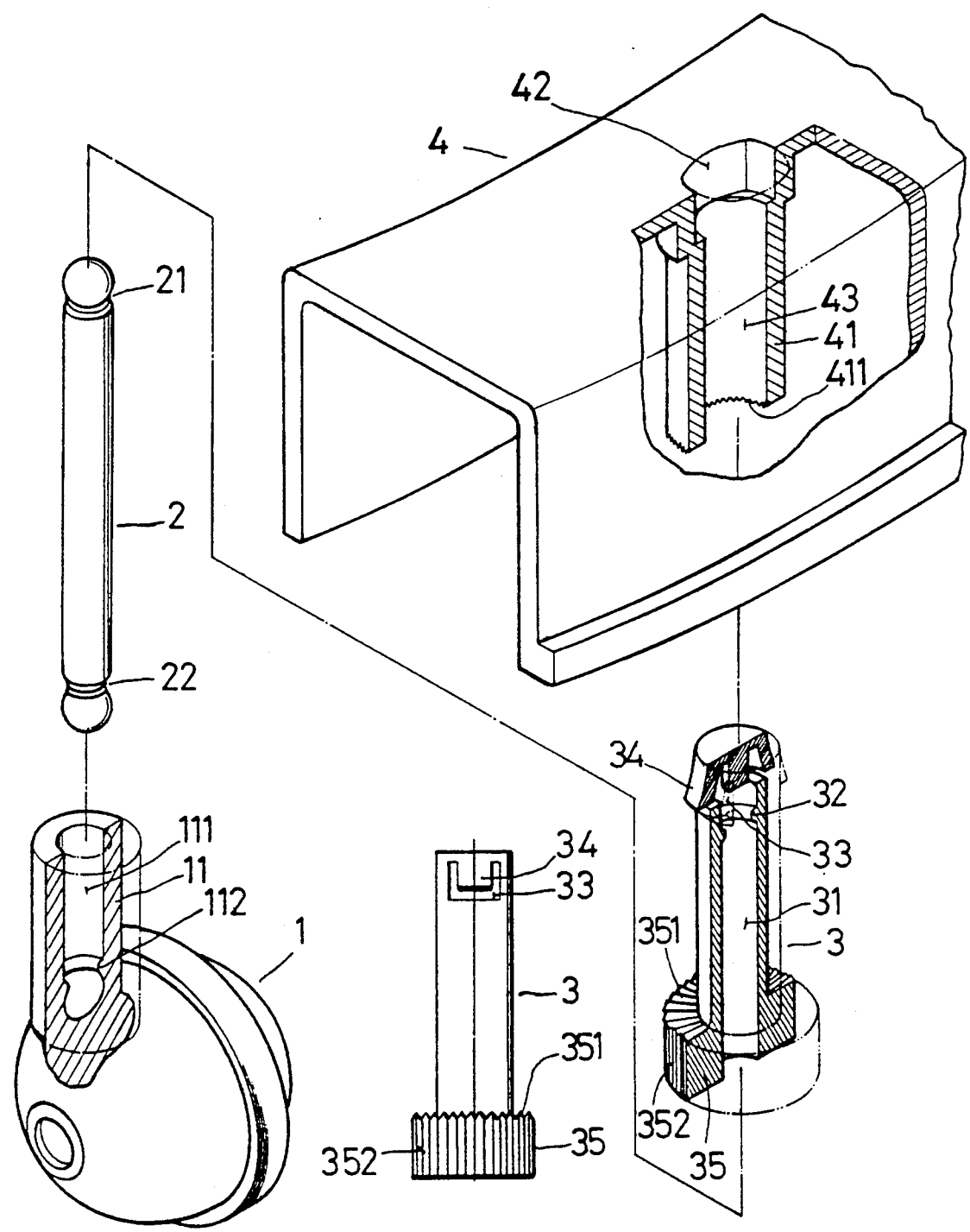
FIG. 3 is a perspective view showing the present inventiion in disassembled condition.
FIG. 3A is an elevational view of the rod cap of the present wheel unit.

The present invention is to provide a wheel unit. Referring to FIG. 3, the preferred wheel unit includes a spherical wheel 1, a rod 2, a rod cap 3, and a fixing sleeve 41 under the annular frame 4 of a slidable infant chair.

Referring to the perspective view of the wheel 1 in FIG. 3, the spherical wheel 1 is provided with a rod supporter 11 which projects vertically and has a hollow 111 inside. There is a flanged ring 112 close the bottom of the hollow 111.

The mentioned rod 2 is vertical and round-ended. There is a ringed groove 21 close its top and a ringed groove 22 close its bottom.

Referring to the perspective view of the rod cap 3 in FIG. 3, the mentioned rod cap 3 has a downward cylindrical hollow 31; close the inner top of the hollow 31 has a flanged ring 32. Referring to FIG. A, two opposite U-shape cuts are positioned in the upper side wall of the rod cap; the interior of each cut 33 becomes an elastic U-shape fragment 34 accordingly, and the elastic fragment 34 can spring outward naturally. The lower side wall of the rod cap 3 is attached by a flanged annulus 35, which has fine projecting stripes 352 around the side wall and has a splintery upward surface 351.

Figure 4:
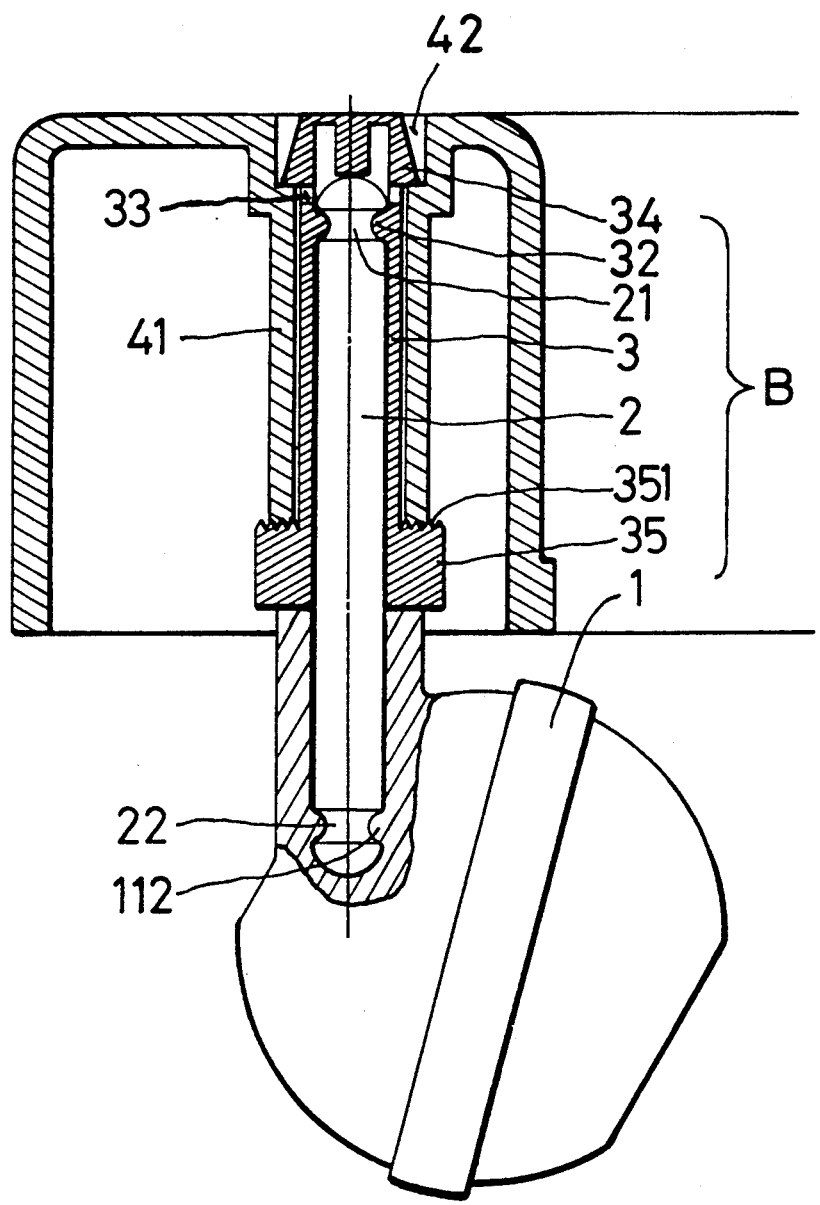
FIG. 4 is a cross-sectional view of the present invention in assembled condition.

Referring to the perspective view of the fixing sleeve 41 in FIG. 3, the fixing sleeve 41 is formed by an upper room 42, and a cylindrical hollow 43. The upper room 42 has an upward elliptic opening, which has a major axis and a minor axis. The length of the minor axis is the same as the diameter of the cylindrical hollow 43. The downward surface 411 of the fixing sleeve 41 is splintery so as to fit with the splintery upward surface 351 when contacted with each other as shown in the figures, U-shaped elastic fragment members 34 are biased outwardly from the sidewall of rod cap 3. When rod cap 3 is inserted into cylindrical hollow or fixed sleeve opening 43, members 34 are compressed to allow forced sliding of rod cap 3 within fixing sleeve 41. Upon passage of members 34 through opening 43 and upper elliptically contoured opening 42, members 34 are displaced to contact on upper surface of frame 4 as shown in FIG. 4.

The assemblage will now be described. Referring to FIG. 4, the rod 2 is inserted into the hollow 111 of the rod supporter 11, with the round end received in the bottom of the hollow 111 through the flanged ring 112, and then the ringed groove 22 is in tight contact with the flanged ring 112. Further, the rod cap 3 is penetrated to the inner top of the hollow 31 by the rod 2, with the ringed groove 21 tightly contacted with the flanged ring 32. Now the flanged annulus 35 is attached to the rod supporter 11. Thus, the rod 2 is so fully inserted in the combined cylinder of hollows 111 and 31 as to tightly assemble the spherical wheel 1 with the rod cap 3. Through the process of assemblage, the spherical wheel, the rod 2, and the rod cap 3 are assembled to be a wheel unit B.

Figures 1, 5:
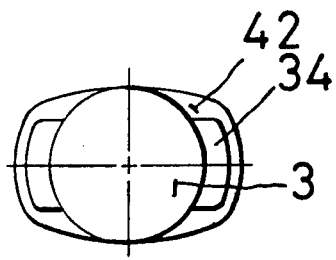
Figures 2, 5:
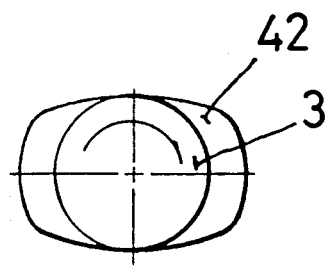

Then, the wheel unit B can be combined with the fixing sleeve 41 by way of inserting the projecting portion of the wheel unit B into the hollow 43 of the fixing sleeve 41. After the top of the rod cap 3 has penetrated through the hollow 43 into the room 42, each opposite elastic fragment 34 is released from the pressure against the side wall of the hollow 43 and projects outward so as to be fixed in the room 42, as shown in FIG. 5-1. At the same time, the splintery upward surface 351 is attached to the downward surface 411 of the fixing sleeve 41. Consequently, the wheel unit B is fixed tightly in the fixing sleeve 41 of the anular frame 4.

Figure 2:
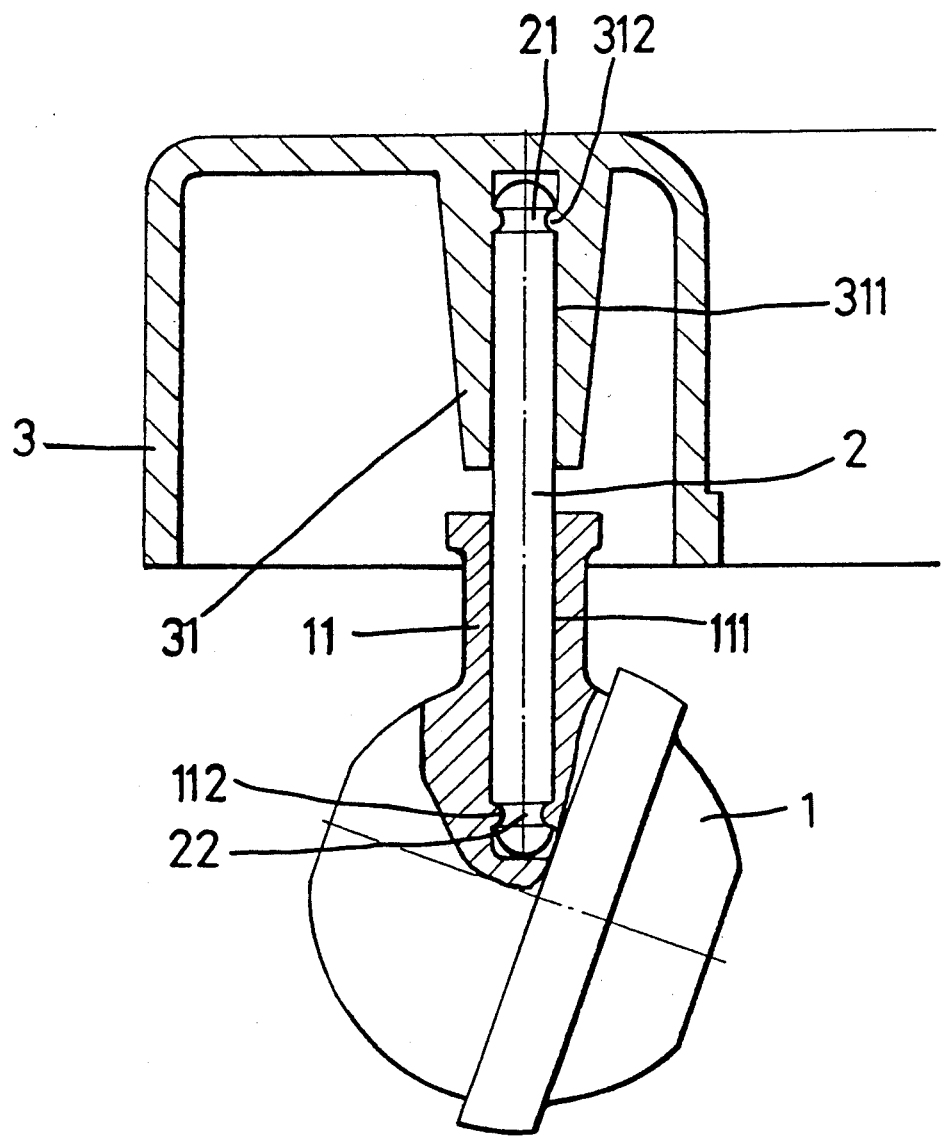
FIG. 2 is a cross-sectional view of another prior wheel unit of a slidable infant chair.

After being used for a long time, the wheel unit may break down or be frazzled. Therefore, the wheel unit of the present invention is designed to be disassembled with ease if it should break down or be frazzled. The process of disassembling the wheel unit is described as following:

Referring to FIG. 4, turn the flanged annulus 35 of the rod cap 3 with the help of the fiction force from the fine projecting stripes 352. The rod cap 3 turns according to the movement of the flanged annulus 35 at the same time. When the rod cap 3 turns to an angle of about ninety degrees, each elastic fragment 34 fixed in the room 42 will be squeezed back in the cut 33 accordingly, as shown in FIG. 5-2. Then, draw the wheel unit B off the fixing sleeve, and install another new wheel unit of present invention according to the described process of assemblage.

Although the present invention has been described and illustrated in detail, it is clearly understood that the same is by way of illustration and example only and is not to be taken by way of limitation. The ecope of the present invention is limited only by the terms of the appended claims.

What is claimed is:

1. A wheel unit for coupling a wheel to a frame of a displaceable infant chair comprising:
   (a) a vertically extending rod cap member having a vertically directed outer side wall defining a closed upper end section having a pair of opposingly located U-shaped elastic fragment elements biased outwardly from said rod cap member outer side wall, said rod cap member further defining an open lower end section having a flanged annular member secured to said rod cap member side wall at a lower end thereof, said flanged annular member having a serrated side wall and a serrated upper surface;
   (b) a vertically directed fixing sleeve member having a through opening, said fixing sleeve member secured to said frame of said infant chair at an upper end and having a lower end including a lower sleeve serrated surface for mating engagement with said serrated surface of said flanged annular member when said rod cap member is inserted within said sleeve member through opening, said U-shaped fragment elements being (1) radially compressed in sliding contact with an inner wall of said fixing sleeve member when said rod cap member is inserted within said through opening of said fixing sleeve member and (2) expanded beyond a diameter of said fixing sleeve member through opening when said upper end section of said rod cap member has passed through said fixing sleeve through opening for releaseably coupling said rod cap member to said fixing sleeve; and,
   (c) a vertically extending rod member releaseably insertable within said rod cap member and a rod supporter member secured to said wheel for releaseably coupling said wheel to said rod cap member, said fixing sleeve and said frame of said infant chair, said rod member having upper and lower grooves for respectively mating with flange ring members formed within said rod cap member and said rod supporter member.

2. The wheel unit as recited in claim 1 where said fixing sleeve through opening includes an upper cross-sectional elliptic contour having a major and minor axis, said rod cap being rotated to a position where said U-shaped elastic fragment elements are substantially aligned with said major axis when said rod cap member is to be removed from said fixing sleeve member.

* * * * *